United States Patent [19]
Brandt

[11] Patent Number: 5,803,200
[45] Date of Patent: Sep. 8, 1998

[54] ADJUSTABLE PIVOT AXIS FOR "THE MISSING LINK" SWIVEL FOR FOUR-LINK RIGID AXLE SUSPENSIONS

[76] Inventor: Larry A. Brandt, P.O Box 21061, Reno, Nev. 89515

[21] Appl. No.: 763,223

[22] Filed: Dec. 10, 1996

Related U.S. Application Data

[60] Provisional application No. 60/008,432 Dec. 11, 1995.
[51] Int. Cl.[6] ....................................................... B60G 9/00
[52] U.S. Cl. ........................... 180/348; 180/378; 280/688
[58] Field of Search .................................... 280/688, 689; 180/348, 378, 905

[56] References Cited

U.S. PATENT DOCUMENTS 5,458,359  10/1995  Brandt ...................................... 280/688
5,524,921   6/1996  Ellingsen ................................. 280/688

OTHER PUBLICATIONS

Catalogue: MORRISON AM, 1994, p. 20 Adjustable four-links for powered rigid rear axles.
Art Morrison Enterprises Inc., 5301 8th Street East, Fife, WA 98424.
Catalogue: Flexi Flyer Industries Inc., 1992, p.13, "Torque Link", and Torque Bisquit Rod Flexi–Flyer Industries, Inc., P.O. Box 34641, Phoenix, AZ 85067.

Primary Examiner—Daniel D. Wasil

[57] ABSTRACT

A suspension for a ground vehicle which connects a rigid axle to the vehicle chassis and stabilizes the rigid axle in fore, aft, and rotational directions. The suspension comprises four links and a swivel. The four links extend within a predetermined number of degrees of parallel to a longitudinal axis of the vehicle, and connect the rigid axle to the vehicle chassis. Two of the links are normally attached above, and two of the links are normally attached below the rigid axle centerline. Therewith, the swivel comprises an arm having two opposite ends and a centrally positioned pivot shaft. Each end of the arm being interposed between an end each of two of the four links thus the pivot shaft is held steadfast to the surface residing between the locations where the pair of link ends would otherwise attach. Said surface being either of the vehicle framework or of the rigid axle, whichever location is preferred. Furthermore, the improvement to the above described swivel four-link suspension comprises a method for an adjustable means which makes it relatively easy to vary the inclination of the swivel pivot shaft axis upon the surface to which the pivot shaft is held firm. Therefore, the swivel arm pivot motion angle can be realigned with the swivel attaching link pair's push-pull direction, for optimal swivel functioning, whenever a change is made to the setup angle of the swivel attaching link pair.

15 Claims, 8 Drawing Sheets

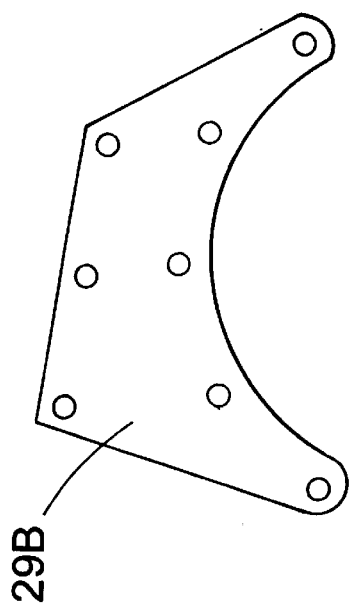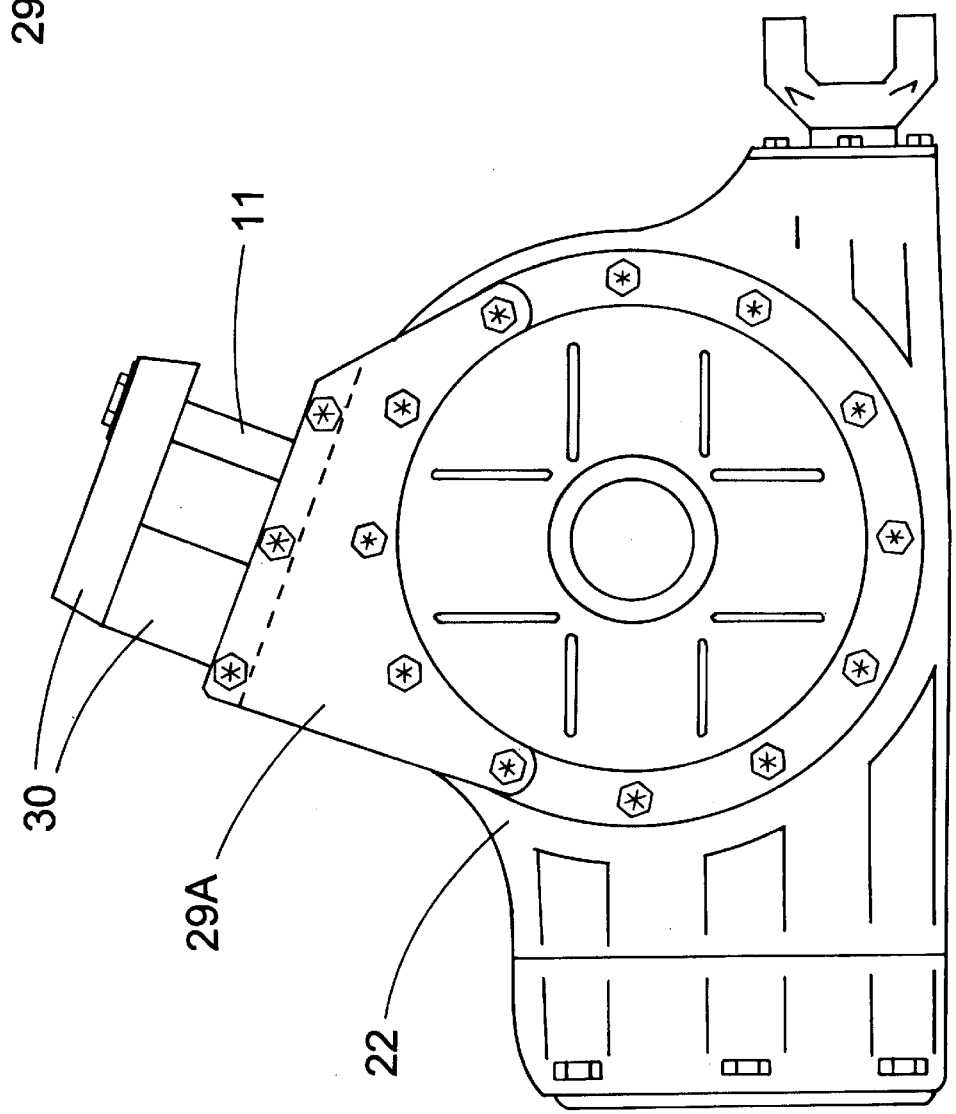

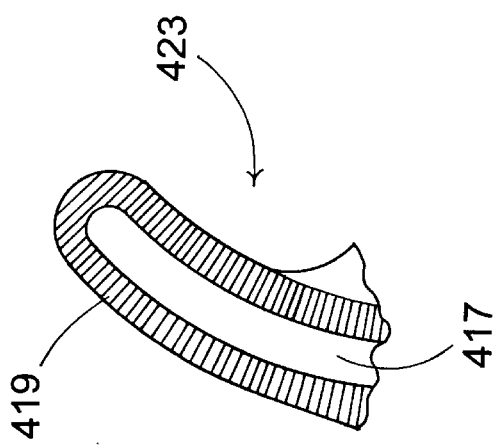
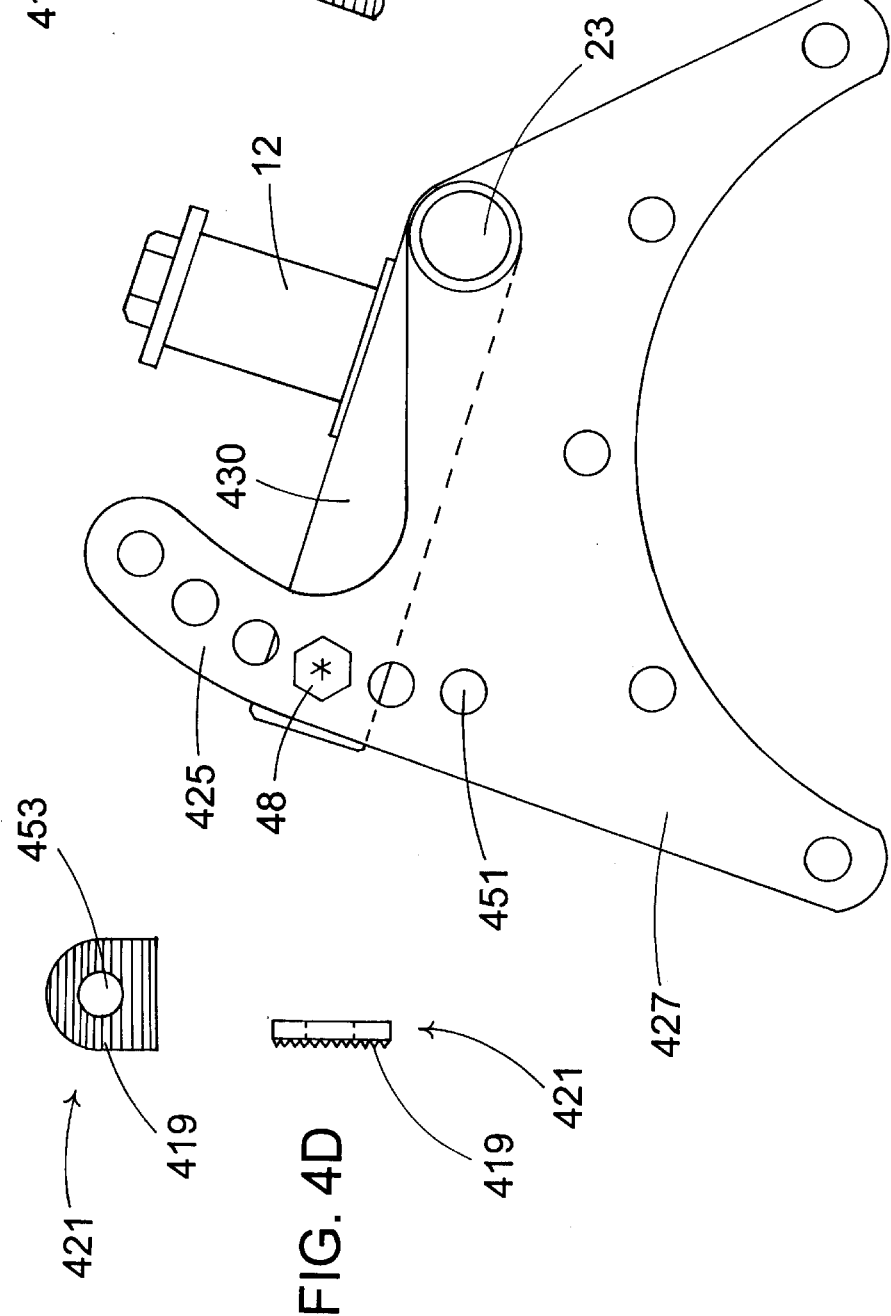

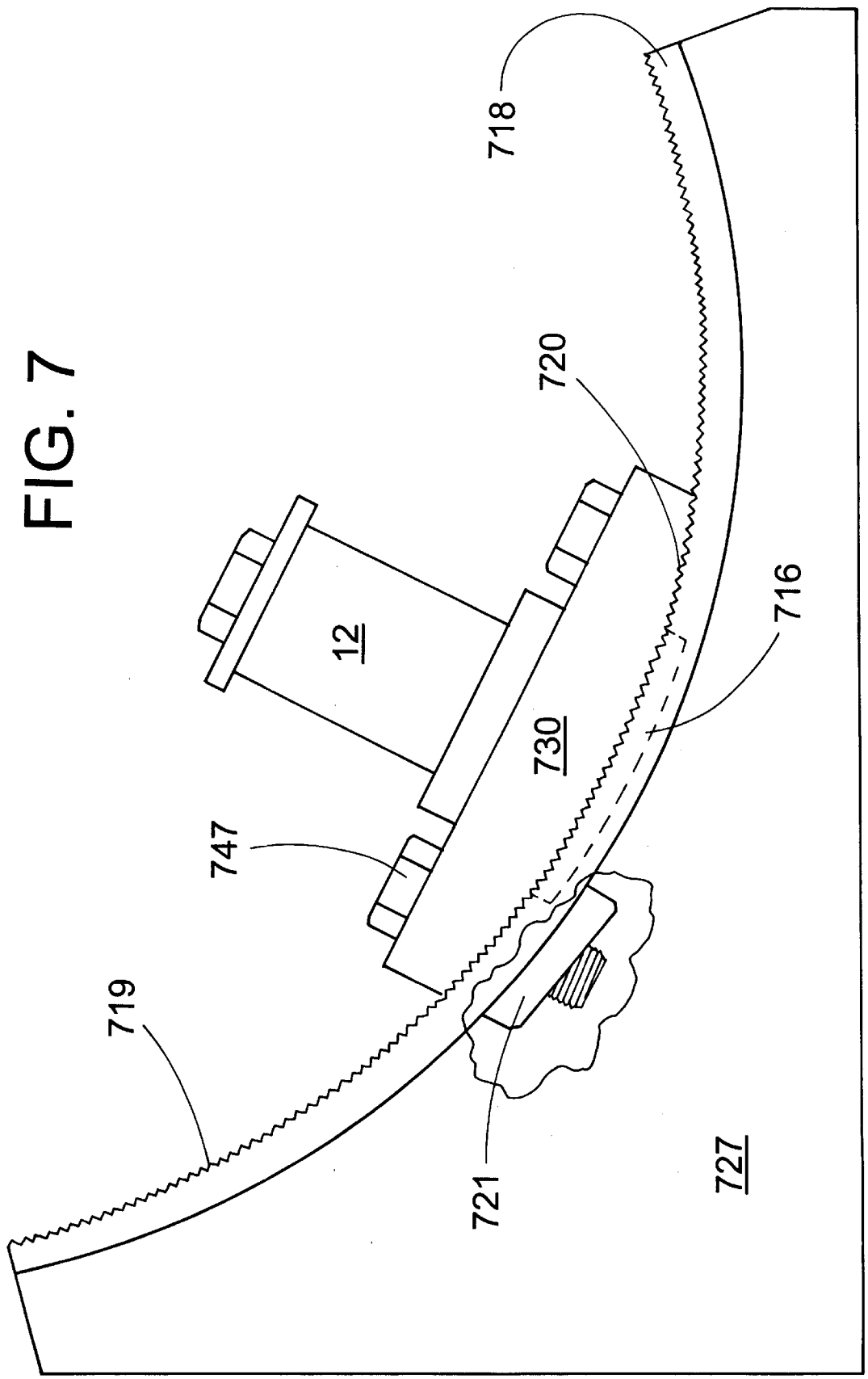

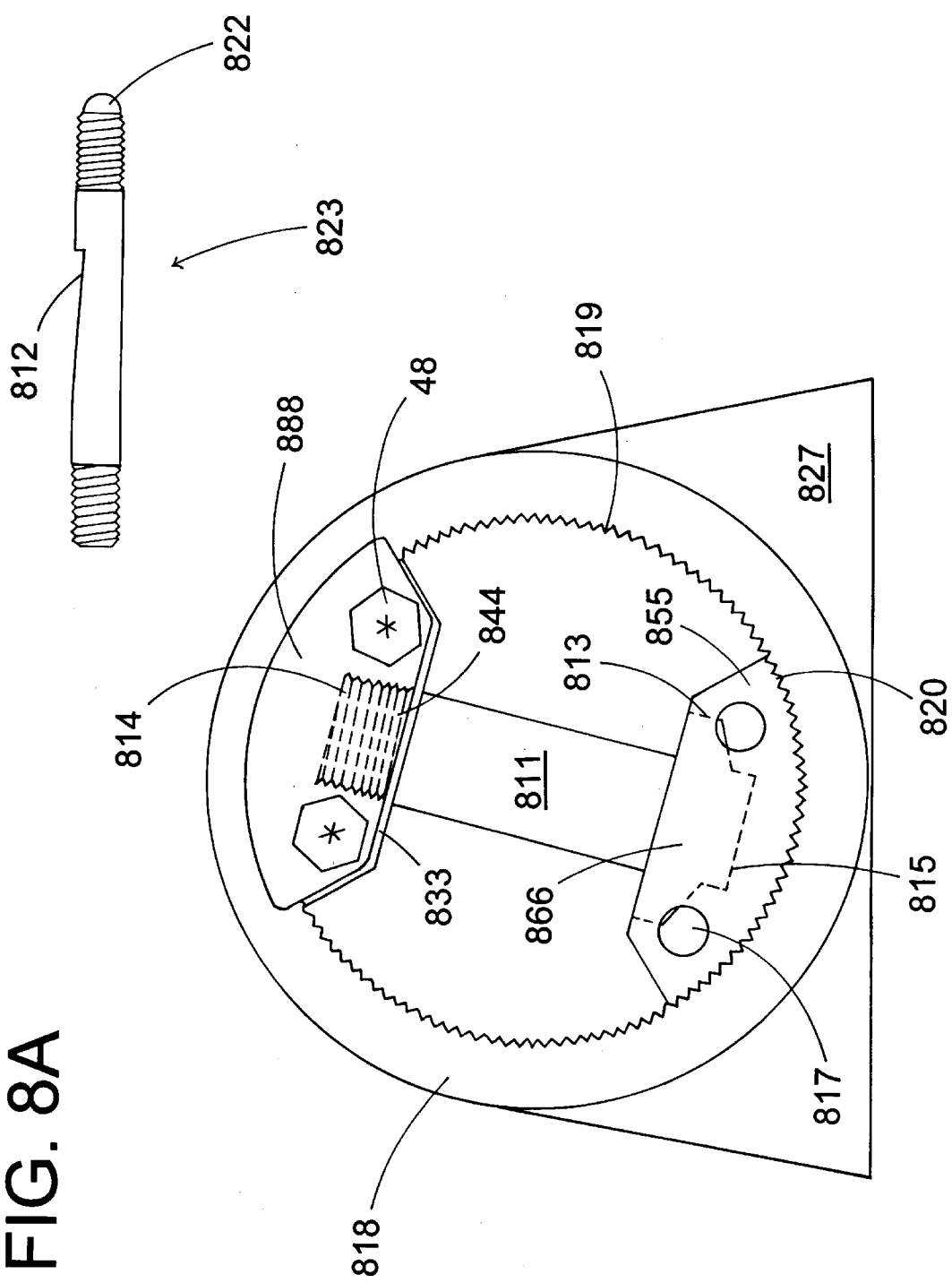

ADJUSTABLE PIVOT AXIS FOR "THE MISSING LINK" SWIVEL FOR FOUR-LINK RIGID AXLE SUSPENSIONS

CROSS-REFERENCE

This application claims the benefit of U.S. Provisional Application No. 60/008,432 filed Dec. 11, 1995.

BACKGROUND

1. Field of Invention

This invention relates to rigid axle suspensions of vehicles, specifically to the "Swivel Four-Link Rigid Axle Suspension," and more specifically to an improved swivel functioning capability.

2. Discussion of Prior Art

While the "Swivel Four-Link Rigid Axle Suspension" U.S. Pat. No. 5,458,359 to Brandt, 1995 Oct., 17, is superior to many other suspension types in its field, it could use an improvement in some applications.

Often in racing and other high-performance situations it is advantageous to have a high range of chasis to rigid axle, connecting link angle options to chose from. In order to get the vehicle to react appropriately to various track or surface conditions.

When a desired link angle change is directed at the swivel attaching pair of links a problem could arise in the swivel functioning. The optimal position for the swivel arm pivot motion is directly in line with the attaching links push-pull direction. Thus, the links push-pull direction should be perpendicular to the swivel arm pivot axis, at initial setup of the suspension.

Although the connecting links' angles change when the suspension is in action like when traversing uneven terrain, hitting a bump, rounding a curve, accelerating or decelerating, etc.; this is accounted for in the swivel design, as this link angle change is relatively small and only momentary.

It is the long duration out of line movement of the swivel attaching link pair to swivel pivot motion, such as a change in the link angle to adjust for surface or track conditions, that can create stress problems like bending, fatigue, fracture, and failure of the swivel assembly, connecting links, and related bracketry, if said components are not made to take long duration stresses in out of line directions.

I believe the reason why Brandt did not include this new feature in his above mentioned patent was mainly because of patent complexity, as well as not fully realizing how desirable this feature can be in some applications.

OBJECTS AND ADVANTAGES

It is an object of the invention to provide for an adjustable swivel pivot axis to the Swivel Four-Link Suspension in order to align the swivel arm pivot movement with its connecting link pair's push-pull direction when a change of said link's angle is made.

An advantage to having an adjustable pivot axis of the swivel is to afford for the ability to easily change the swivel arm's pivot motion angle for optimal efficiency, thus giving the equipped vehicle a wide range of connecting link angle options, to allow for preferred vehicle reaction characteristics to various track or surface conditions.

BRIEF DESCRIPTION OF THE DRAWINGS

FIG. 3A is a side view of a rigid drive axle as shown in FIGS. 1 & 2 which utilizes another embodiment of the invention to alter the inclination of the swivel pivot axis.

FIG. 3B is a different degreed angle plate of the embodiment shown in FIG. 3A.

FIG. 4A is a side view of an embodiment of the invention utilizing a type of bracket similar to that seen in FIGS. 1 & 2 to adjust a variation of the swivel pivot shaft and base.

FIG. 4B is a variation of the adjustment means for the swivel axis angle as seen in FIG. 4A.

FIGS. 4C & 4D are a face and end view respectively of the securement means for the adjustment variant of FIG. 4B.

FIG. 7 is a side view embodiment that incorporates a curved toothed track to change the swivel pivot axis angle.

FIG. 8A is an embodiment in side view that utilizes an inside splined ring which encompasses the swivel pivot shaft and allows for its angle adjustment.

FIG. 8B is a threaded stud wedge used to lock and secure the pivot shaft into the splined ring of FIG. 8A.

DESCRIPTION OF THE PRIOR ART DRAWING

Figure 1:
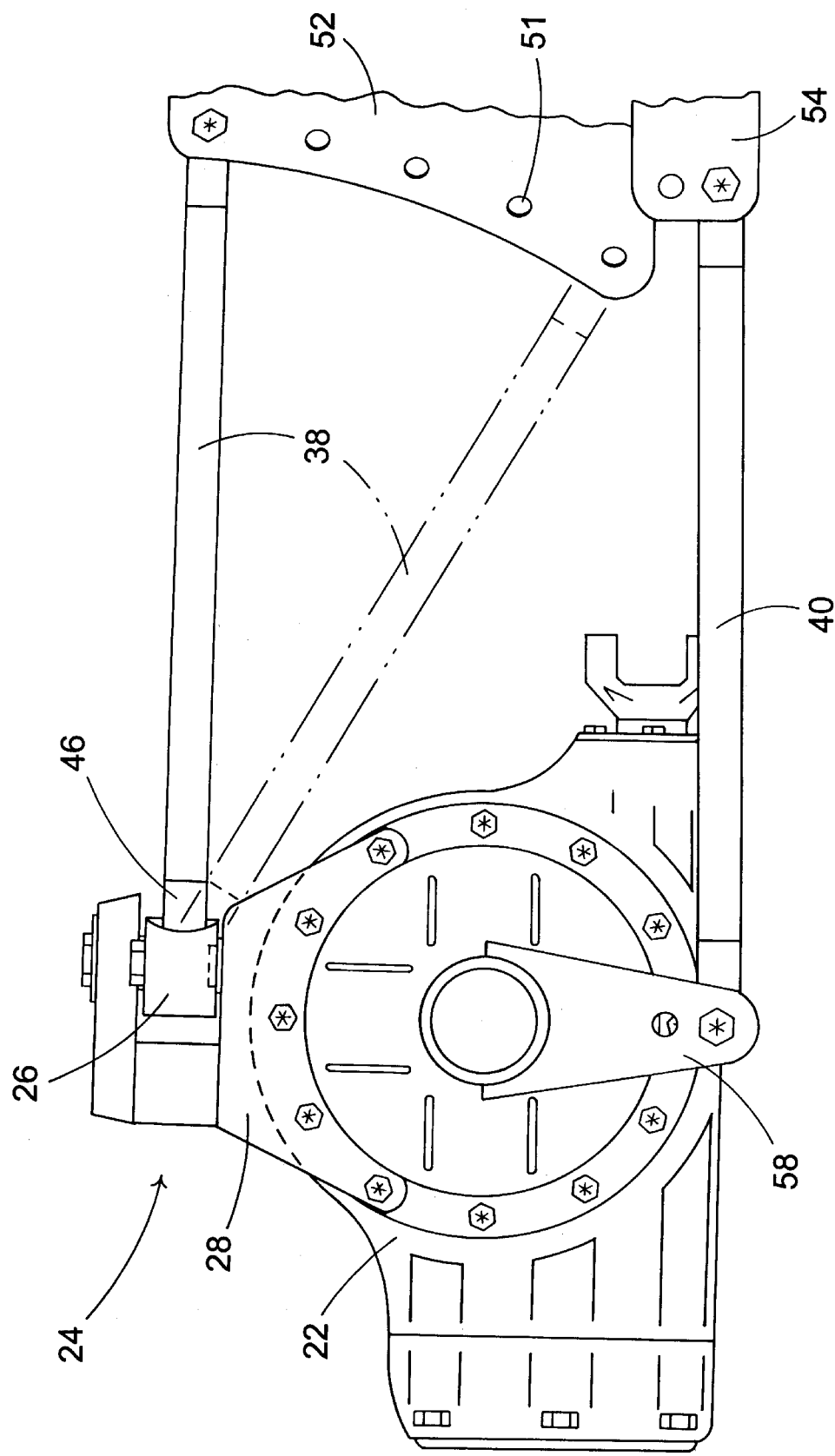
FIG.1 is a prior art side view of a complete Swivel Four-Link Rigid Axle Suspension.

In FIG. 1 the rigid drive axle pictured is a quick gear change type. Although there are numerous other types of rigid drive axles that could be shown this type works well for illustration purposes. Plus, its center gear housing design allows for a unique method of swivel assembly attachment. It should not be construed as a limitation on the scope of the present invention or any of the embodiments thereof which may incorporate its design into their methods of attachment.

As FIG. 1 is a side view only one of the lower connecting link pair and one of the upper connecting link pair are visible, that which is closest to this side. In this prior art drawing of a Swivel Four-Link Suspension, rigid drive axle 22 has a bracket 58 attached beneath its axle tube. A lower connecting link 40 extends from bracket 58 and attaches to a lower vehicle frame bracket 54. A swivel assembly 24 is attached and held firm by a swivel mount base 28 which stradles the upper gear housing section of axle 22. A swivel arm 26 pivots about a center axis which is held steadfast to base 28. Arm 26 has two opposite sides with the pivot axis in between. An upper connecting link 38 attaches to each side of arm 26. The other end of each link 38 attaches to an upper vehicle frame bracket 52. Frame bracket 52 has numerous link mounting holes 51 to afford for as many link angle setups.

At the extreme bottom mounting hole 51 of upper bracket 52 there is an alternate position of link 38 shown in phantom. From this illustration it appears as though link 38 may not be able to be positioned at this location due to a link attaching end 46 interference with swivel arm 26. If link 38 could be made to fit in this bottom hole 51 mounting position it almost surely would bend or break upon the first significant verticle axle movement or tilt. Thus inviting potential disaster to the vehicle and occupants employing this suspension arrangement as shown in phantom.

Therefore lets now move on to the improved present invention, and the benefits thereof.

DETAILED DESCRIPTION AND OPERATION OF THE VARIOUS EMBODIMENTS OF THE PRESENT INVENTION

Figure 2:
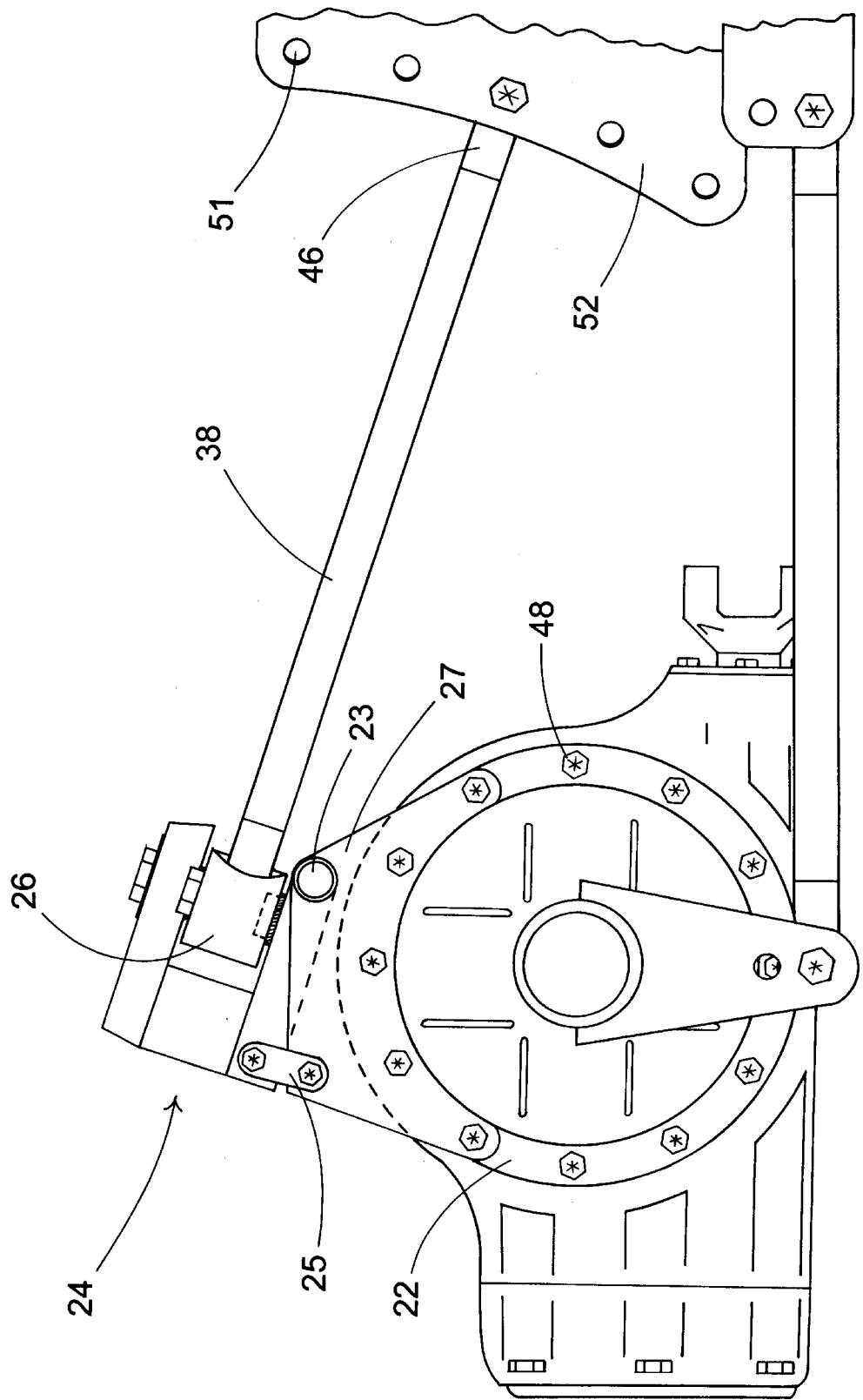
FIG. 2 is a side view which also depicts a complete Swivel Four-Link Suspension, but with an embodiment of the present invention incorporated into the swivel assembly.

FIG. 2 depicts the same or similar componentry as that of Prior Art FIG. 1. The difference being an embodiment of the present invention is incorporated into swivel assembly 24 and the angle of swivel arm 26 and upper link 38 is lower by approx. 15 degrees to align said parts and link attaching end 46 with intermediate mounting hole 51 of bracket 52.

Arm 26 is able to keep its pivot motion in line with link 38 by having its pivot axis made adjustable. The adjustable pivot axis is accomplished in this drawing by rotating entire swivel assembly 24, less mount plate 27, in the same direction as the angle change of link 38. The pivot point of this movement occurs at a cross shaft 23 which is securely affixed to the bottom front location of swivel assembly 24. Cross shaft 23 is held stable in position to rigid axle 22 by way of mount plate 27 which attaches to the upper portion of the gear case middle of rigid drive axle 22 by way of gear case fasteners 48.

The angle of swivel assembly 24 is changed, and held secure, by an angle adjustment plate, rod, or turnbuckle 25 of which there may be one or more located opposite cross shaft 23 at or near the back of swivel assembly 24 to connect and stabilize assembly 24 to mount plate 27.

If adjustment plate 25 is not a turnbuckle type of adjustment means, then it could be a longer plate with multiple adjustment holes, or come in various lengths of plates or rods to effect angle changes.

In FIG. 3A there is a rigid axle 22 gear case atop which sits a swivel arm mount 30 having its swivel arm pivot shaft 11 visible as there is no arm shown. In this view there is a similar mount plate, as in FIGS. 1 & 2, to connect and stabilize swivel arm mount 30 to rigid axle 22. The difference being that mount plate 29A is now the entire adjustment and securement means arm mount 30.

Mount plate 29A is made to set arm mount 30, and hence pivot axis 11, at approximately a 20 degree angle from either horizontal or vertical depending on where the measurements start from. FIG. 3B shows a mount plate 29B that sets the swivel at approx. a 10 degree angle. There can be as many plates with varying degrees as is necessary to fulfill the swivel angle adjustment range desired.

Bear in mind that mount plate 29A & B or its many variants that can be seen in some of these Figures, can be a pair of plates that attach on each side of the gear case of rigid axle 22 and hence to each side of swivel assembly. The plates can also be interconnected in clear space away from the axle gear case to form a bracket which straddles the gear case and allows for a flat surface in which to fasten or weld the swivel assembly onto.

In FIG. 4A a mount plate 427 is also the swivel pivot angle adjustment means. A swivel pivot shaft 12 is held perpendicular and steadfast to a swivel base 430. Secured to one end of swivel base 430 is a cross shaft 23 which both supports and permits pivoting of base 430 upon mount plate 427. At the other end of mount plate 427 is an adjustment leg 425 that extends upward in a curve that coincides with a portion of an imaginary circumference which has its center in common with the axis of cross shaft 23. Leg 425 has numerous apperatures 451 progressing along it through which a fastener 48 can pass to secure the end of swivel base 430 opposite cross shaft 23, in order to hold swivel pivot shaft 12 in the appropriate angle.

FIG. 4B depicts an adjustment leg vaiant 423. Numerous apperatures 451 on adjustment leg 425 of FIG. 4A have been replaced by a long curved slot 417 as shown in FIG. 4B. Slot 417 allows for a fastener to slide along permitting more precise swivel angle changes. The many lines that project from and border along slot 417 are actually uniform transverse striations 419.

FIG. 4C shows a face view of a locking clamp 421 having identical transverse striations 419 across it, and a hole 453 in the middle. Hole 453 allows a fastener to pass in order to fasten clamp 421 to leg 423 of FIG. 4B. When held tight with a fastener striations 419 of clamp 421 mesh with striations 419 of leg 423 in order to secure the chosen angle position of swivel base 430.

FIG. 4D shows clamp 421 turned on end allowing a better view of striations 419 across the face.

Figure 5:
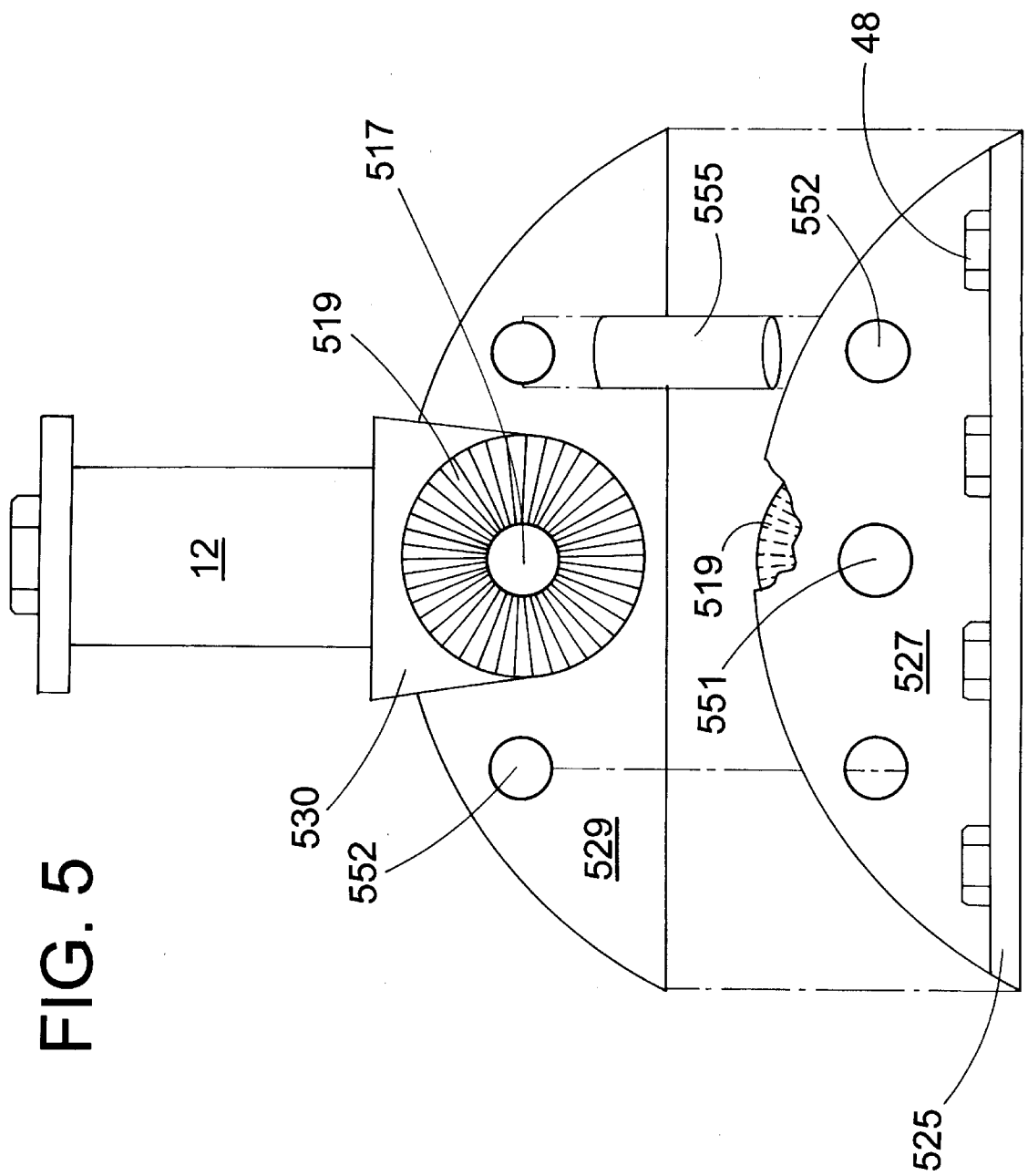
FIG. 5 is a side elevational exploded view of an embodiment that uses a radial striated base and mount to alter and secure the angle of the swivel pivot axis.

FIG. 5 shows a swivel pivot shaft 12 in an upright angle comprising a base 530. Base 530 comprising a cicular uniform radial striated surface 519 on opposing sides with one side visible. A hole 517 extends through base 530 and passes through the centers of both base mounted radial striated surfaces 519 residing on opposite sides of base 530.

Immediately behind base 530 is mount plate 529 which has a corresponding radial striated surface 519 and a center hole 551 on its inside face. Identical to that which is visible in the cut away of an opposing adjustor mount plate 527.

Mount plate 529 is attached to a surface at its bottom either at the rigid axle or framework of a vehicle by welding or other fastening means. Opposing adjustor plate 527 depicted removed in exploded view is attached to said surface by a group of fasteners 48 which pass through a horizontal base portion 525 of adjustor plate 527 into said surface. If the holes through which fasteners 48 pass are made oblong, then fasteners 48 need only be loosened in order to permit plate 527 to slide away from base 530, thereby disengaging the corresponding radial striated surfaces 519.

Each mounting plate 527 and 529 have three corresponding holes across their respective faces. Center hole 551 of each plate aligns with hole 517 through swivel base 530. A bolt or fastening shaft passing through plate 527 base 530, and plate 529 will align corresponding striated surfaces 519 of each. The bolt will also provide a pivot point for which to change the angle of shaft 12, and when clamped tightly will engage striated surfaces 519, and lock shaft 12 in the position chosen.

If center holes 517 & 551, and striated surfaces 519 were made large enough, and mount plates' 527 & 529 steel thick enough, then the center hole through each may be the only one needed. Otherwise, the other two holes 552 are there for reinforcing bolts to pass and lend additional clamping pressure to plates 527 & 529. A spacer 555 should be used between opposing holes 552 at each side of base 530 in order to keep plates 527 & 529 from distorting under the clamping force of said reinforcing bolts.

Figure 6:
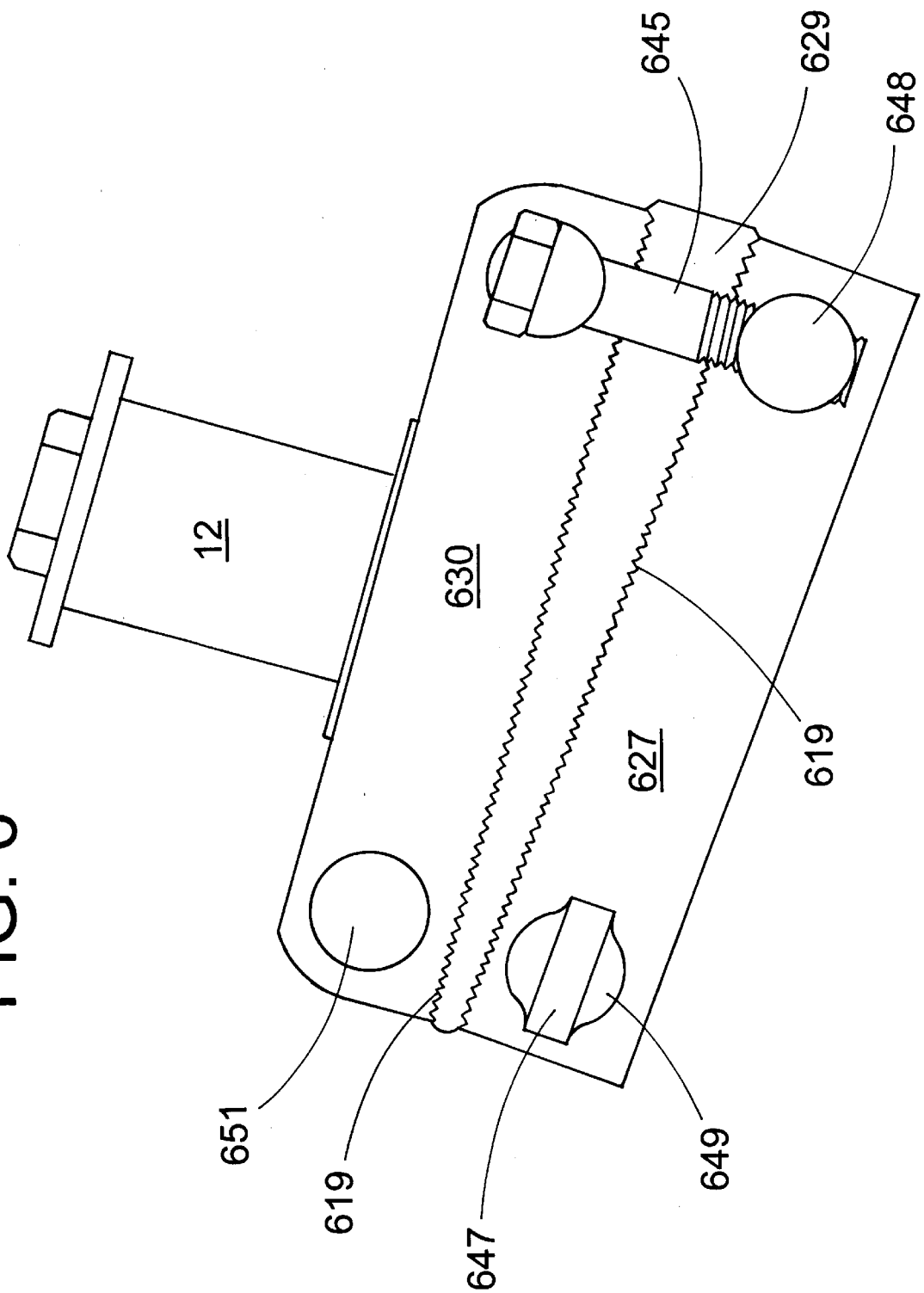
FIG. 6 is a side view of an embodiment that employs the use of various degreed angle wedges to adjust the pivot axis of the swivel.

FIG. 6 shows a swivel pivot shaft 12 fixed steadfast to a swivel base 630. Base 630 has uniform v-pattern striations 619 across its bottom. A base mount 627 is similar in appearance and fits directly under swivel base 630. Base mount 627 has identical striations 619 across its top which mesh perfectly with the striations on swivel base 630 bottom. Striations 619 keep swivel base 630 from slipping on base mount 627.

The bottom of base mount 627 can attach to a surface of a rigid axle or vehicle frame member by a welding or other fastening means.

Near each end of both swivel base 630 and base mount 627 resides a hole or bore 651 through which a pivotal clamping shaft 649 passes. There is a total of four bores 651 for four shafts 649. In this drawing one bore 651 is left empty for illustration purposes. A shaft end 647 protrudes past each bore 651 opening. Shaft end 647 can be stamped flatter in a direction perpendicular to the axis of shaft 649, or end 647 could be a welded on piece. End 647 could be milled flat on one side, or end 647 could be left alone with the same cross section area as its origin shaft 649. In any case a hole is drilled through end 647 in a direction perpendicular to the axis of shaft 649 in order for a fastening bolt 645 to pass. Bolt 645 will pass through an end 647 of swivel base 630 through a corresponding end 647 of base mount 627. A nut at the end of bolt 645 can be used to supply the clamping force. Or, an end 647 which does not support the head of bolt 645 could be threaded, thus becoming an end 648 to accept the threads of bolt 645 directly. Either way works fine to hold swivel base 630 to base mount 627 and permit striations 619 to mesh.

Adjustments to the angle of swivel pivot shaft 12 are made by the inclusion of various degreed angle wedges 629 which are sandwiched between swivel base 630 and base mount 627. A five degree wedge is shown in place. Wedges 629 have identical uniform v-pattern striations 619 on both their top and bottom in order to mesh with counterpart striations 619 of swivel base 630 and base mount 627.

Now, for example, to have an angle adjustment range of swivel shaft 12 in one direction of from 0 to 30 degrees in 5 degree increments, only three different wedges are needed: a 5 degree wedge, a 10 degree wedge, and a 15 degree wedge. The same three wedges could be used for a 0 to 30 degree adjustment range in the opposite direction, for a total adjustment range sweep of 60 degrees. That's why base mount 627 is shown at an angle in the drawing, to give more adjustment range in one direction. To double the number of angle positions for adjustments in even finer increments only one extra 2½ degree wedge would be required, for a total of four wedges.

The reason why shafts 649 and bores 651 are round allows shaft ends 647 or 648 to rotate and align with each other in order to permit bolt 645 to fit through and tighten securely, no matter how many wedges are in place, provided bolt 645 is long enough, or other lengths of bolts are on hand.

FIG. 7 is an interesting embodiment which employs a ski jump in order to launch a shuttle craft into oblivion—just kidding. Actually, FIG. 7 is an embodiment utilizing a curved track 718 to permit changes to the angle of a swivel pivot shaft 12. Track 718 has uniform teeth 719 or transverse striations across its two rail top surfaces. The underside of track 718 is steadfastly affixed to a track base mount 727. Track mount 727 is attached to a surface of a rigid axle or vehicle chassis member by a welding or other securement means.

Above the surface of track 718 resides swivel pivot shaft 12 steadfastly affixed to a swivel base 730. Swivel base 730 has a curved uniform toothed bottom 720 in which to conform with track 718 and mesh with teeth 719. A pair of base locking bolts 747 secure swivel base 730 in the desired position along track 718. One bolt 747 passes through base 730 near each end from top to bottom, and between the two rails of track 718. A clamping plate 721, seen in the cut away view, resides under track 718 and is threaded in order to accept threads of bolts 747. When bolts 747 are tightened this clamps securely base 730 to track 718. A lower base protrusion guide 716 shown hidden by broken line has a close tolerance fit between the rails of track 718. This results in extra lateral stability to swivel base 730 upon track base mount 727, and drastically reduces the chance of bolts 747 being sheared off in the event of substantial, but more likely minor but continual side forces acting on swivel shaft 12. The angle of swivel pivot shaft 12 is changed by loosening bolts 747 enough to disengage base teeth 720 with track teeth 719 and sliding swivel base 730 to a different position along track 718; then reengaging base teeth 720 with track teeth 719 and retightening bolts 747 to lock swivel base 730 in place.

Finally, FIG. 8A utilizes a ring 818 of substantial thickness to prevent distorting. A ring base mount 827 is affixed to ring 818 by welding or other attaching means. Base mount 827 is needed to stabilize ring 818 firmly in position, and provide a sturdy surface for attachment to a rigid axle or vehicle chassis member. Uniform transverse striations or teeth 819 reside completely around the inner surface of ring 818.

A swivel pivot shaft 811 is positioned inside ring 818 such that the shaft's axis coincides with an imaginary line representing any diametrical position of the ring. Swivel shaft 811 is supported at each of its two ends by an end mount 833 & 855. Each end mount 833 & 855 have uniform transverse teeth 820 on their respective ring engaging side in which to mesh with teeth 819 of ring 818.

End mount 833 has threads cut into a swivel shaft end receptical 814 shown hidden by broken line. A shaft end 844 has counterpart threads cut on it for which to screw into receptical 814, providing a way to add shims if needed, for a precise fit of the swivel arm. Lateral movement of mounts 833 & 855 within ring 818 is prevented by a mount securement plate 888 which clamp to each side of the mounts and extend onto each side of the ring. The clamping force is exerted on plates 888 of mount 833 by a pair of fasteners 48 which pass through the plates 888 of mount 833 at right angles and adjacent to each side of the axis of swivel shaft 811. Plates 888 of mount 855 are fastened similarly but not the same. Please read on.

A swivel shaft end 866 has a ridge 813 around its circumference which conforms to a receiver hollow 815, shown hidden by broken line, of mount 855. Ridge 813 extends a minuscule amount into a plate fastening bore 817, of which there are two, one to each side of the axis of shaft 811. A stud wedge 823 of FIG. 8B has a small bevel 812 carved lengthwise on one side near its middle. Stud wedge 823 is threaded on both ends to accept nuts.

The procedure described next is performed the same at each of the two bores 817. Stud wedge 823 is positioned in bore 817 so that the deepest end of bevel 812 conforms to the interposition of ridge 813 in bore 817. a securement plate 888 is placed over the ends of both studs 823 on each side of mount 855, followed by nuts which are screwed on loosely. The first nuts tightened are those on the end of studs 823 nearer the deepest depression of bevel 812. This end of stud 823 is identified by a knob or protrusion 822 as shown in FIG. 8B. As stud 823 is pulled in the direction of the tightening nut, the depression of bevel 812 becomes shallower thus wedging stud 823 against ridge 813. Hence, slop is removed between swivel shaft 811, mounts 855 & 833, and ring 818. In the process plate 888 has also been clamped tight on that side. Then the nuts on the other end of studs 823 are tightened to clamp plate 888 on that side of mount 855.

To change the angle of swivel shaft 811, remove fasteners 48 and plates 888 from mount 833. Remove nuts and plates 888 from mount 855. If studs 823 aren't loose after the nuts are removed, simply tap the stud end identified by knob 822 with a hammer to loosen. In most instances when changing the angle of swivel shaft 811 a swivel arm like that depicted in FIGS. 1 & 2 designated as arm 26, will be surrounding shaft 811 and hiding it from view. In any case, next, just slide swivel arm with shaft 811 and mounts 833 & 855 as a unit out the side of ring 818 holding mount 855 from falling off swivel shaft end 866. Rotate this assembly to the desired swivel arm pivot angle then reinstall in ring, following the procedure outlined previously for securement of swivel shaft 811 in ring 818.

Now that the illustrated embodiments have all been described in detail and many specificities proclaimed, these should not be construed as limitations, but rather as exemplifications of embodiments thereof. Many other variations are possible. All of the embodiments have parts that can be modified from what is shown, and methods for doing something in one embodiment can often be perfomed similarly to another embodiment. Therefore, it can be reasonably assumed that many other variations and methods not herein described could be achieved that fall within the scope of this invention.

Of the vehicle types which could utilize the swivel four-link suspension and those which would benefit most from the incorporation of the present invention or an adjustable pivot axis could include those cars and trucks of high performance and racing use which benefit from having a multiple position link angle adjustment capability, in which to compensate for different track or surface conditions, or changes to the vehicle ride height.

The invention as claimed is:

1. In a suspension for a ground vehicle which connects a rigid axle to a vehicle chassis, and stabilizes said rigid axle in fore, aft, and rotational directions; said suspension comprising four links and a swivel; said four links extend within a predetermined number of degrees of parallel to a longitudinal axis of said vehicle and connect said rigid axle to said vehicle chassis; said swivel comprising an arm having two opposite ends and a centrally positioned pivot shaft, each end of said arm being interposed between an end each of two of said four links with said pivot shaft being held firm to a surface residing between the locations where the pair of link ends would otherwise attach;

wherein the improvement comprises an adjustable means to alter the angle of the pivot shaft axis in relation to said surface;

whereby the swivel arm pivot motion angle can be altered to correspond with a change to the setup angle and inherent push-pull direction of the swivel attaching link pair.

2. The suspension of claim one further including a base to which said pivot shaft is fixed, said base is attached to a mount, and said mount is affixed to said surface; wherein said base is attached at one end to said mount by a pivot, and said base is attached at the other end to said mount by an angle adjustment and securement means.

3. The suspension of claim 2 wherein said angle adjustment and securement means is a turnbuckle, of which there may be one or more.

4. The suspension of claim 2 wherein said angle adjustment and securement means is a plate or rod, of which there may be one or more, whereby the angle of said pivot shaft axis is altered by switching to a different length of said plate or rod.

5. The suspension of claim 2 wherein said angle adjustment and securement means is a plate, of which there may be one or more, with multiple mounting holes through it, through which a fastener can pass to secure said base to the chosen position or angle.

6. The suspension of claim 2 wherein said angle adjustment and securement means is a plate, of which there may be one or more, with a long slot extending lengthwise through it, through which a fastener can pass to adjust and secure said base to the desired angle.

7. The suspension of claim 2 wherein said angle adjustment and securement means is an adjustment leg that extends off of said mount, said adjustment leg has numerous holes progressing along it, through which a fastener can pass to secure said base to a chosen position or angle.

8. The suspension of claim 2 wherein said angle adjustment and securement means is an adjustment leg, wherein said adjustment leg has a slot progressing along it, through which a fastener can pass to secure said base to a chosen angle.

9. The suspension of claim 1 further including a base, to which said pivot shaft is fixed, and said base is secured to a mount, and said mount is affixed to said surface; whereby the angle of said base and hence, said pivot shaft axis can be changed by switching to a different angled mount.

10. The suspension of claim 1 further including a base, to which said pivot shaft is fixed or is a machined extension of, and said base is secured to a mount, and said mount is affixed to said surface; whereby said base pivots about and is locked in place by a fastening shaft passing through and clamping said base to said mount.

11. The suspension of claim 1 further including a base, to which said pivot shaft is fixed, said base is secured to a mount, and said mount is affixed to said surface; whereby the angle of said base and hence said pivot shaft axis is changed by the inclusion of various degreed wedges sandwiched between said base and said mount.

12. The suspension of claim 1 further including a base, to which said pivot shaft is fixed, said base is secured to a mount, and said mount is affixed to said surface; wherein said base comprises a curved bottom surface and said mount comprises a corresponding a generally somewhat longer curved top surface; whereby the angle of said base and hence said pivot shaft axis is changed by moving said base to a different position on said mount and securing in place.

13. The suspension of claim 1 further including a ring, to which said pivot shaft is secured in position lengthwise within said ring such that said pivot shaft axis generally coincides with a diametrical position of said ring, and said ring is affixed to said surface; whereby the angle of said pivot shaft axis is changed by repositioning and resecuring said pivot shaft so that said pivot shaft axis coincides with a different generally diametrical position of said ring.

14. A suspension for a ground vehicle comprising a four-link arrangement to connect a rigid axle to a framework of said vehicle and stabilize said rigid axle in fore, aft, and rotational directions; the four links extend within a predetermined number of degrees of parallel to a longitudinal axis of said vehicle; a pair of said four links attach to said rigid axle above, and a pair of said four links attach to said rigid axle below, a centerline of said rigid axle; the other end each of said four links attach to said framework of said vehicle;

in combination with, a swivel comprising an arm having two opposite ends and a centrally positioned pivot shaft; said swivel is interposed between either pair of links at one end and the surface to which said links would otherwise attach, such that each end of said arm attaches to a corresponding end each of the link pair, with said pivot shaft held steadfast to said surface residing between the locations where each link of said link pair would otherwise attach;

thereby said swivel eliminates bind in said suspension by permitting one end of said rigid axle to move up or down independently of the other axle end, when one said link pair is positioned at an angle to the other link pair in the initial setup of the suspension;

the improvement to said suspension is characterized in that said pivot shaft comprises an adjustable means to alter the angle of its axis in relation to the surface in which it is fixed, thus making it capable to realign the pivot motion of the swivel arm with the attaching link pair's lengthwise direction, whenever a change has been made to the setup angle of the swivel attaching link pair;

whereby said suspension can have a wide range of link angle positions from which to select, and be able to maintain proper alignment of said swivel to said attaching link pair.

15. In a swivel four-link suspension that stabilizes a rigid axle of a vehicle in fore, aft, and rotational directions while permitting freedom from bind in said suspension due to the inherent action of the swivel itself; said swivel comprising an arm which pivots about a shaft which is held steadfast to a surface of said rigid axle or the vehicle chassis;

wherein the improvement comprises an adjustable means to vary the inclination of the pivot shaft axis in relation to said surface;

whereby a change to the pivotal plane of movement of said arm can be attained to correspond with a change in the inclination and consequently the lengthwise or push-pull direction of a pair of connecting links which attach to the swivel arm.

* * * * *